United States Patent [19]
Tran et al.

[11] Patent Number: 6,065,126
[45] Date of Patent: May 16, 2000

[54] METHOD AND APPARATUS FOR EXECUTING PLURALITY OF OPERATIONS PER CLOCK CYCLE IN A SINGLE PROCESSING UNIT WITH A SELF-TIMED AND SELF-ENABLED DISTRIBUTED CLOCK

[76] Inventors: Thang Minh Tran, 5209 Eagle Trace Trail, Austin, Tex. 78730-1428; Rupaka Mahalingaiah, 6503 Farmdale La., Austin, Tex. 78769

[21] Appl. No.: 09/017,278

[22] Filed: Feb. 2, 1998

[51] Int. Cl.[7] ............................................. G06F 1/12
[52] U.S. Cl. ............................................................ 713/401
[58] Field of Search ..................................... 713/400, 401

[56] References Cited

U.S. PATENT DOCUMENTS

5,774,699  6/1998  Nagae ..................................... 713/400
5,901,322  5/1999  Herbst et al. ...................... 713/601 X
5,987,620  11/1999  Tran ....................................... 713/500

Primary Examiner—Thomas M. Heckler

[57] ABSTRACT

A self-timed and self-enabled distributed clock is provided for a functional unit that has variable executing time. The self-timed clock provides plurality of clock pulses within a clock cycle for latching of result and starting execution of the next operation. The functional unit can execute more than one operation per clock cycle thus increasing the utilization of the execute unit and the performance of the processor. The state machine is designed to keep track of the current clock pulse and the execution time of the current operation. The functional unit includes the output queue buffer to keep plurality of results from execute unit. The functional unit executes data close to its optimal timing while the data between functional units are synchronized on the clock boundary as in synchronous design. It is more efficient than synchronous design yet the outputs are deterministic as the clocking is preserved in the design.

25 Claims, 7 Drawing Sheets

Fig. 1

| Input State /100 | Valid Input /101 | Early Done /102 | Late Done /103 | Output State /104 | Clock Pulse /105 |
|---|---|---|---|---|---|
| x | 0 | x | x | S0 | x | /110 |
| S0 | 1 | 1 | x | S1 | Clock0 | /111 |
| S1 | 1 | 1 | x | S0 | Clock1 | /112 |
| S0 | 1 | 0 | 1 | S0 | Clock1 | /113 |
| S1 | 1 | 0 | 1 | S1 | Clock0 | /114 |

METHOD AND APPARATUS FOR EXECUTING PLURALITY OF OPERATIONS PER CLOCK CYCLE IN A SINGLE PROCESSING UNIT WITH A SELF-TIMED AND SELF-ENABLED DISTRIBUTED CLOCK

BACKGROUND OF THE INVENTION

1. Field of the Invention

This invention relates to a self-timed and self-enabled clock for functional unit with variable execution time. More particularly, this invention relates to a self-timed and self-enabled distributed clock for a pipeline-processing unit.

2. Brief Description of the Related Technology

In general, microprocessors (processors) achieve high performance by executing multiple instructions per clock cycle and by choosing the shortest possible clock cycle. The term "clock cycle" refers to an interval of time accorded to various stages of processing pipeline within the microprocessor. Storage devices (e.g. registers and arrays) capture their values according to a rising or falling edge of a clock signal defining the clock cycle. The storage devices store the values until a subsequent rising or falling edge of the clock signal, respectively. The phrase "instruction processing pipeline" is used herein to refer to the logic circuits employed to process instructions in a pipeline fashion. Although the pipeline may include any number of stages, where each stage processes at least a portion of an instruction, instruction processing generally includes the steps of: decoding the instruction, fetching data operands, executing the instruction and storing the execution results in the destination identified by the instruction.

Because processor clock frequencies are expected to reach the gigahertz range by the end of the century, clock skew and jitter may account for up to 15% of the clock cycle period, leaving 85% of the period for computation logic. Clock skew is the difference in arrival times of clock edges at different parts of the circuit. Clock skew bounds the minimum and maximum delay through computation logic. Interconnection delays do not scale linearly with increasing clock frequencies, as clock skew takes an increasingly larger portion of useful clock cycles. The clock signal is also a major contributor to power consumption and noise, especially when there is no other activity. The clock can account for up to 25% of the total power consumption. Furthermore, all functions are forced to operate at the same worst case frequency. For example, most operations of an arithmetic-logical unit (ALU) require only 30% of the clock cycle to produce the results. The clock frequency of the ALU is set by the rare worst case operation. These problems are mostly solved with asynchronous processing design.

Asynchronous processing design, however, inherently has another associated set of problems, mostly related to verification, testing, availability of computer-aided-design tools, design methodology, and marketing. An advantage of a synchronous clock design is that all components start together and generate output in a predetermined and predictable fashion. It is much easier to verify a synchronous design. For an asynchronous design, if each component is working at its own pace, the verification process is very difficult. The outputs of the processor are not deterministic due to actual silicon process variations. Additionally, since the gate delay varies based on the process technology, it is difficult to verify and test an output. A glitch in an asynchronous design can cause the output to be incorrect in comparison to a synchronous design where the state of a signal matters only at a next clock edge.

One prior art approach to asynchronous processing design is design techniques used on Advanced RISC Machines (ARM) processors at the University of Manchester, United Kingdom. This asynchronous design technique uses request-and-acknowledge handshake protocol for synchronization between processing blocks. This technique requires several logic gate delays between the blocks for this handshake protocol. This ARM technique arguably does not show an improvement in performance over synchronous designs, but shows an advantage over synchronous designs in reducing power dissipation. The functional unit completes the operation in actual time, thus there is a potential for increasing in performance.

Therefore, the need exists for an asynchronous clock design having the heretofore typically mutually exclusive advantages of low power dissipation, allowing functional unit to operate close to the optimal timing, and an easily verifiable output where all components start together and generate output in a predetermined and predictable fashion.

SUMMARY OF THE INVENTION

The problems outlined above for prior art designs are in large part resolved by a distributed self-timed and self-enabled clock design in accordance with the present invention. The present invention is adaptable for use in any digital circuit clock design. In particular, the present invention provides flexible self-timed and self-enabled clocks distributed across all pipeline-processing units which allows the pipeline architecture to execute instructions at the highest possible processing frequency. Furthermore, the self-timed and self-enabled clock generates plurality of clock pulses in a clock cycle allowing the processing unit to pick the optimal clock pulse for its particular operation. The self-timed and self-enabled clock is referred to herein as a self-clock.

The self-clock is distributed to each processing unit in the pipeline-processing unit. Each processing unit uses an edge of the locally generated input clock, which has been output from the previous processing unit, thus avoiding a clock skew problem. Since the self-clocks and processing units are enabled only with valid data, the pipeline-processing unit according to this invention avoids clock jitter, and reduces power dissipation, noise, and electro-magnetic interference associated with a centralized clock.

Using the clock design according to the present invention, between processing units, multiple sets of flip-flops, which are referred to as "queue buffers", are implemented to store data and to avoid reprocessing events in the case of a stall condition. The queue buffers latch the incoming data such that a stall signal generated by the stalled processing unit need not propagate to all previous processing units. Additionally, increasing the number of queue buffers further decreases power dissipation by disabling clocks of pipeline stages not processing data.

In addition, another queue buffer is used within the processing unit for storage of plurality of results within a clock cycle. The plurality of clock pulses from the self clock and the output queue buffer allow the processing unit to execute plurality of operations per clock cycle. The utilization of the execute unit increases along with the performance of the microprocessor.

The self-clock design is further contemplating programmable feature to adjust the clock frequency according to specific application. The self-clock consists of at least two programmable features: coarse and fine adjustments. The coarse adjustment allows the self-clock to match with a wide range of external clock frequency and to scale with process generation. The fine adjustment allows the self-clock to match with variation of the clock edge within a certain frequency. The present invention includes these feature for synchronization with external clock frequency thus the outputs of the processor is deterministic for verification and testing purpose.

In converting from synchronous design, one of the major concerns about the distributed clocks is matching of the distributed clock period; especially when accounting for routing delay and extra gating logic for the clock signals. The neighborhood synchronization and fine-tuning of the distributed self-clocks should match the clock period and clock edge throughout the design. Implementing this self-clock design technique can use the same design methodology as in synchronous design. As a brute force technique in matching the clock periods of the self clock during initialization, a global synchronized clock is routed to all blocks for comparing and adjusting the self-clocks. This technique minimizes the accumulative of errors from a long chain of sequential self clocks.

BRIEF DESCRIPTION OF THE DRAWINGS

Other objects and advantages of the invention will become apparent upon reading the following detailed description and upon reference to the accompanying drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
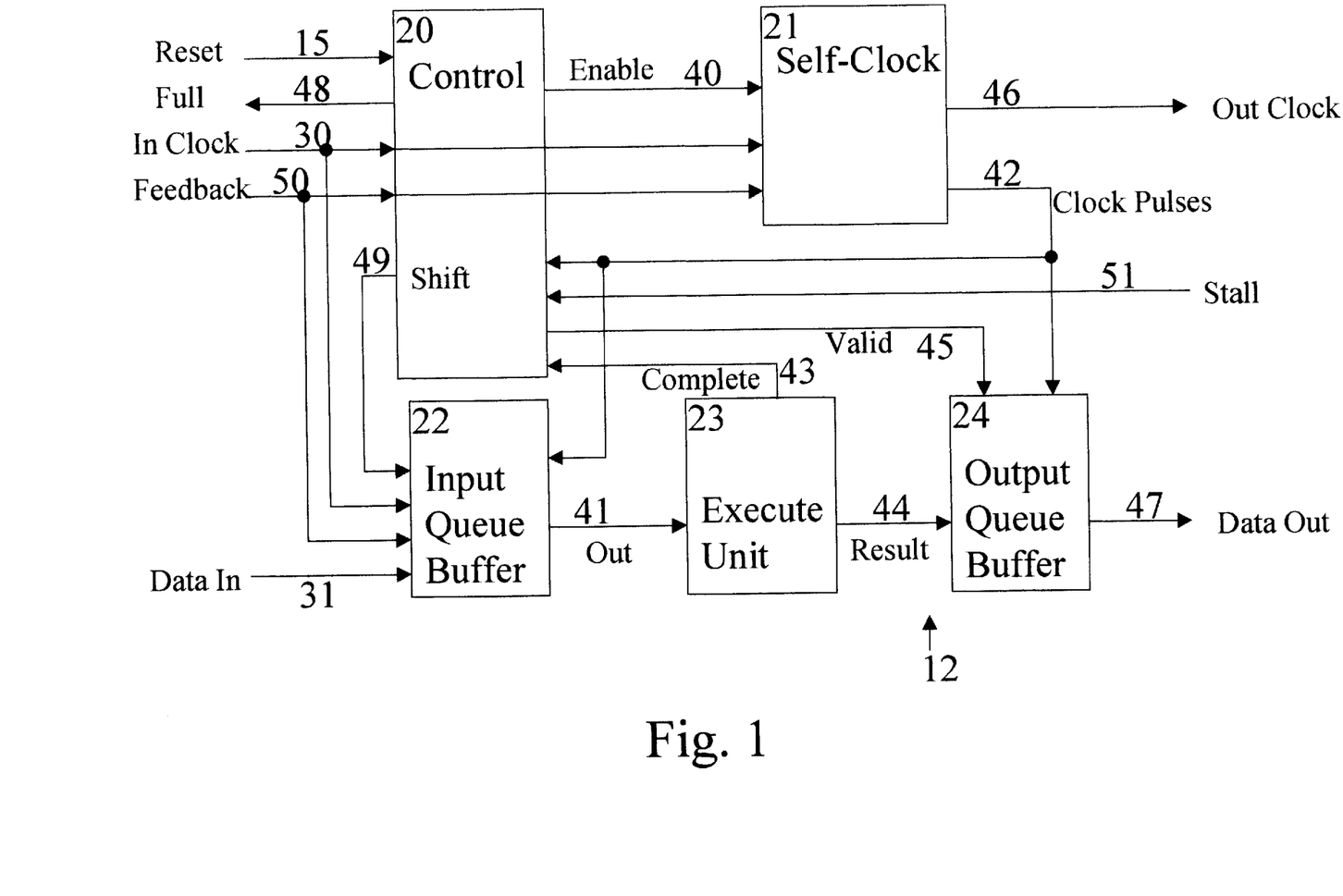
FIG. 1 is block diagram of the processing unit of a microprocessor illustrating basic functional blocks.

Referring to FIG. 1, an embodiment of a functional processing unit 12 according to the present invention, with basic blocks, is shown. The processing unit 12 includes a control unit 20, a self-clock unit 21, an input queue buffer 22, an execute unit 23, and an output queue buffer 24. The processing unit 12 is a general functional unit of a processor. This processing unit 12 has a variable execution time based on the input data and/or function.

In general operation, the processing unit 12 receives an in clock 30 along with valid input data 31 from a previous processing unit. The input queue buffer 22 latches input data 31 by the end of the clock cycle and output data on bus 41 to execute unit in the next clock cycle. Bus 49 from the control unit 20 enables the appropriate entry in the input queue buffer of latching of input data 31. As valid data is presented on bus 41, execute unit 23 processes data and sends the result on bus 44 to the output queue buffer 24. Execute unit 23 scans the input data 41, determines the required execution time, and sends completion signal 43 to control unit 20. The completion signal 43 indicates when the operation is completed with valid result on bus 44. The output queue buffer 24 latches the result data and sends to output data bus 47 in the next clock cycle. The control unit 20 uses the in clock 30 to set up the enable signal 40 and inturn enable the self-clock circuit of self-clock unit 21. The self-clock unit 21 generates plurality of clock pulses 42 to the input queue buffer 22, the output queue buffer 24, and control unit 20 for latching and shifting of data according to the required execution time on bus 43 of the operation in execute unit 23. The control unit 20 uses the completion signal 43 in its state machine to generate result valid signal 45 for the output queue buffer 24 to latch result data 44 and shift signal 49 for the input queue buffer 22. The input queue buffer 22 uses in clock 30 to latch input data 31 and the clock pulses 42 to shift data through the queue buffer. The output queue buffer 24 sends output data on bus 47 to the subsequent processing unit along with the Out clock 46 from the self-clock unit 21. The output queue buffer 24 shifts its result data as the output data on bus 47 is received by the subsequent processing unit.

In addition, the control unit 20 keeps track of the status of the input queue buffer. As the input queue buffer becomes full, the full signal 48 is sent to the previous processing unit. Upon receiving the full signal 48, the previous processing unit will not send any new data until the full signal 48 is deactivated. The full signal 48 takes into account a potential input data in the same cycle that it is generated. Similarly, the full signal 51 from the next processing unit is used by the control unit 20 to stall the operation of the execute unit 22. In addition, the feedback clock 50 of the subsequent processing unit is used by the control unit 20 and the self-clock unit 21 for synchronization and restarting the operation after stalling.

In synchronous design, all functional processing units operate at the same frequency according to the operation with the worst-case timing. If the operation is completed before the end of the cycle, then the execution unit is idle until the next cycle for the next operation. Especially when the execution time is depended on the input data pattern or the type of operation. In this invention, the clock period is subdivided into fixed intervals. If the operation can complete within a preset interval, then the next operation can start immediately. The processing unit 12 can execute more than one operation per clock cycle, thus increasing the utilization of the processing unit and the performance of the processor. The self-clock unit 21 generates a clock pulse 42 for each interval to shift data from input queue buffer 22 through execute unit 23 to output queue buffer 24 within the processing unit 12. Because the intervals are preset, the output result 44 is deterministic thus avoiding the undeterministic behavior associated with asynchronous design. Upon receiving the input data 41, execute unit 23 decodes input data 41 to indicate the number of intervals required for completion of this particular operation. In another embodiment, the decode block can be located in the input queue buffer or as an independent unit. The control unit 20 then uses the completion signal 43 to set up its state machine and schedules the latching of output result 44 into the output queue buffer 24 and shifting of the input queue buffer 22.

One particular example is the arithmetic and logical unit (ALU). The execution time is depended on the input patterns of the operands and the type of operation. The clock frequency is set according to the worst case operation where inputs consist of all binary 1's. On the normal input pattern, the operation time is 30% of the worst case operation time. Most ALU operations require only 30% of the clock cycle to produce the results. In synchronous design, all ALU operations use the worst case timing. In this example, the self-clock unit 21 of this invention can be designed to have three clock pulses at 33%, 67%, and 100% of the clock cycle. The inputs can be quickly scanned by execute unit 23 to determine the number of intervals (on bus 43) that is required for the current operation. The control unit 20 uses this information to select a particular clock pulse for latching of result data 44 in the output queue buffer 24 and shifting of the next operation in the input queue buffer 21. Up to three operations can be completed in a clock cycle using the same execute unit 23.

Figure 2:
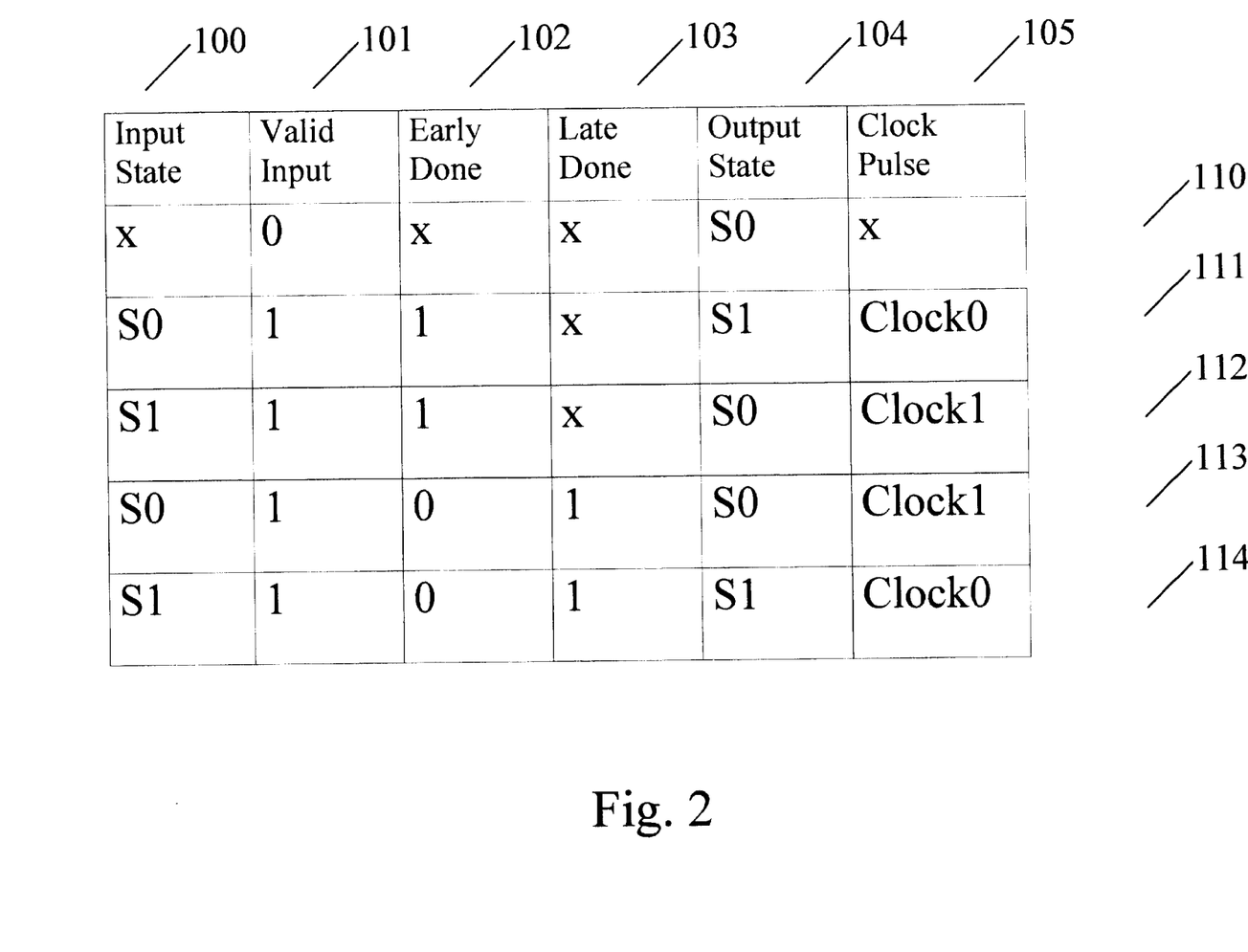
FIG. 2 is truth table for the state machine of the processing unit in FIG. 1 for controlling the latching and shifting of data through the processing unit.

For simplicity, if the self-clock unit 21 generates two clock pulses 42 at 50% (Clock0) and 100% (Clock1) of the clock's period, then in most cases, two operations can be completed per clock cycle. The control unit 20 keeps track of the operation and which clock pulse 42 is used for latching and shifting of data in the input and output queue buffers. For this example, the truth table of the state machine in control unit 20 is shown in FIG. 2. Since there are two intervals, the state machine consists of two states, S0 and S1. The first column 100 of the truth table is the input state of the state machine. The second column 101 indicates the valid data input from the input queue buffer 22. The completion signal 43 from execute unit 23 consists of two signals: Early Done as shown in column 102 and Late Done as shown in column 103. The Early Done input 102 means that the current operation will take less than 50% of the clock cycle (one interval). This Late Done input 104 means that the current operation will take more than 50% of the clock cycle (two intervals). The fifth column 104 is the output state of the state machine which will be used as the input state by the next clock pulse. The last column 105 indicates which clock pulse 42 will be used by the input queue buffer 22 for shifting data, by the output queue buffer 24 for latching of result data 44, and by the state machine for advancing to the next state.

The flow of the state machine can be understood by following the rows of the truth table of FIG. 2. The state S0 means that the current operation started in the first interval of the clock cycle. The state S1 means that the current operation started in the second interval of the clock cycle. Row 110 is the initial state when there is no valid input data (column 101), the state machine remains in S0 (column 104). In row 111, with valid input data (column 101), the Early Done of column 102 indicates that the current operation which started in state S0 will be completed in this interval. The output state (column 104) will be in state S1 where the next operation will be started. The first clock pulse, Clock0 as indicated in column 105, will be used by the state machine to advance to state S1, the input queue buffer 22 to shift in the next operation, and the output queue buffer 24 to latch the result data 44. In state S1 of row 112, similar actions are taken for the current operation to be completed in the second interval of the clock cycle.

In row 113, with valid input data (column 101), the Late Done of column 103 indicates that the current operation will take the whole clock cycle to complete. The output state (column 104) will remain in state S0 where the next operation will be started. The first clock pulse, Clock0, is ignored by the state machine, the input queue buffer 22, and the output queue buffer 24. The second clock pulse, Clock1 as indicated in column 105, will be used by the state machine to advance to state S0, the input queue buffer 22 to shift in the next operation, and the output queue buffer 24 to latch the result data 44. In state S1 of row 114, similar actions are taken for the current operation to be completed in the first interval of the next clock cycle.

The truth table in FIG. 2 illustrates the basic operation of the processing unit 12. With more intervals within the clock cycle, the state machine of control unit 20 will be more complex. The number of intervals is determined by the frequency of completion of the operations. With this design as long as the control unit 20 can accurately schedule the operations, the intervals are not necessary to be equal.

Figure 3:
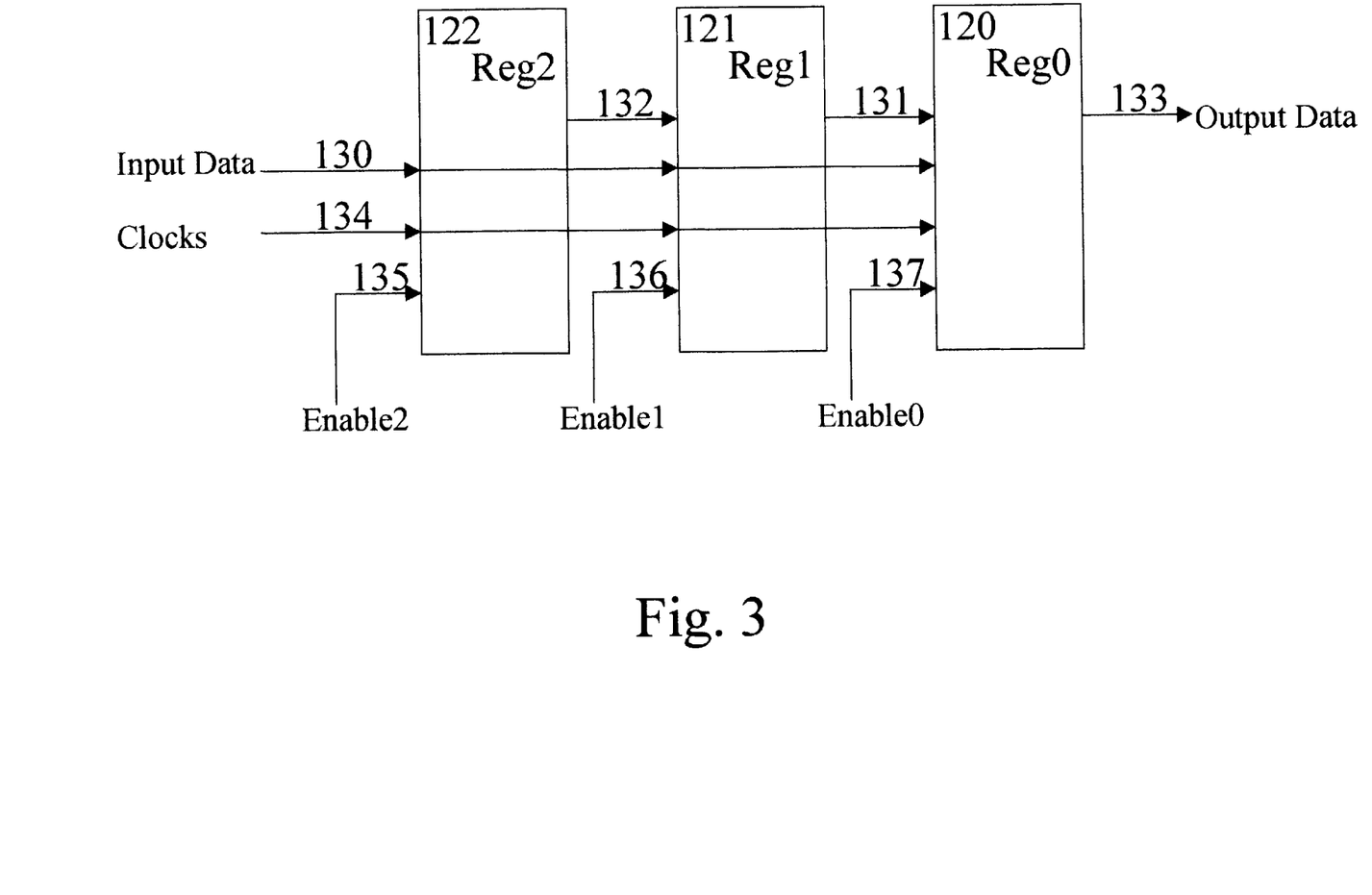
FIG. 3 is schematic of the basic queue buffer used for input and output buffers of the processing unit of FIG. 1.

The queue buffers 22 and 24 consist of storage registers for shifting and latching of input data. As knowledge by those in the art, there are many physical implementation of the queue buffer. The basic concept of the queue buffer is latching of input data into the next available entry and shifting of data to the output as first-in-first-out. One embodiment of the basic three-entry queue buffer is shown in FIG. 3. Another embodiment of the queue buffer (not shown) is by changing the pointer of the first entry to the next register instead of actual shifting of data. The queue buffer in FIG. 3 consists of three registers, 120, 121, and 122. Register 120 is the first register that can accept input data 130 or shifted data 131 from register 121. Register 121 is the second register that can accept input data 130 or shifted data 132 from register 122. Register 122 is the third register that can accept input data 130. The priority for latching input data 130 is in the order of first register 120, then second register 121, then third register 122. The register accepts input data 130 if it is available. Once register 122 accepts input data 130, the queue buffer is full, the previous processing unit cannot send any more data. Another function of the queue buffer is shifting data through the registers. For input queue buffer 22, once the data from register 120 is successfully executed by execute unit 23, then the data are shifted from register 121 to register 120, and from register 122 to register 121. For output queue buffer 24, once the data in register 120 is sent to the subsequent processing unit, then the data are shifted from register 121 to register 120, and from register 122 to register 121.

The conditions for latching and shifting of data in the queue buffers are in the control unit 20. The enable signals, 135, 136, and 137, select the registers and clock pulses. The clock input 134 consists clock pulses 42 from self-clock unit 21 and in clock 30 from previous processing unit. The input queue buffer 22 uses in clock 30 for latching of input data from previous unit and clock pulses 42 for shifting of data. The output queue buffer 24 use clock pulses 42 for latching of result data and Out clock 46 for shifting of data.

Figure 4:
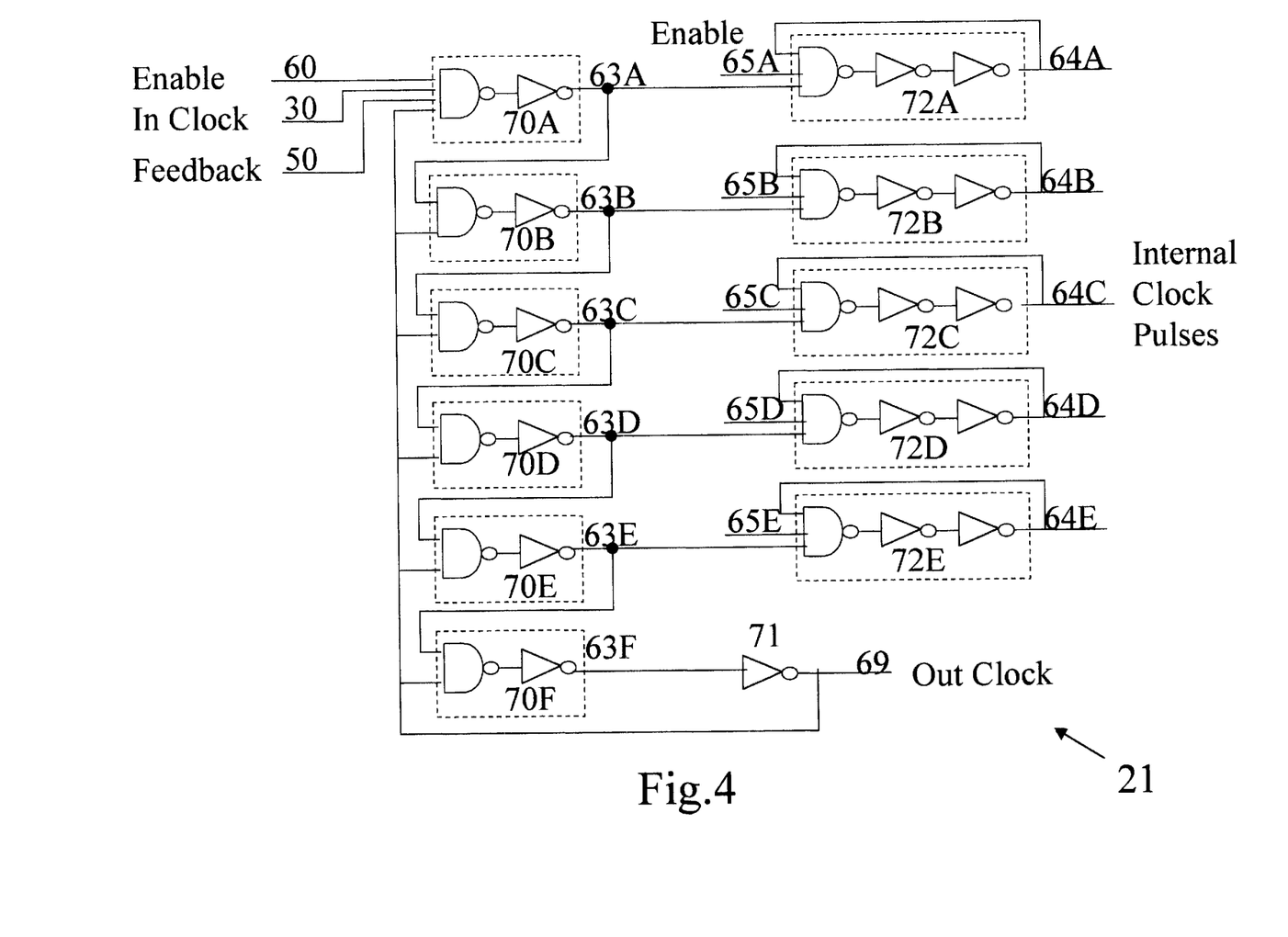
FIG. 4 is schematic for an embodiment of the self-timed and self-enabled clock for generating the plurality of clock pulses and plurality of clock edges according to the present invention.
Figure 5:
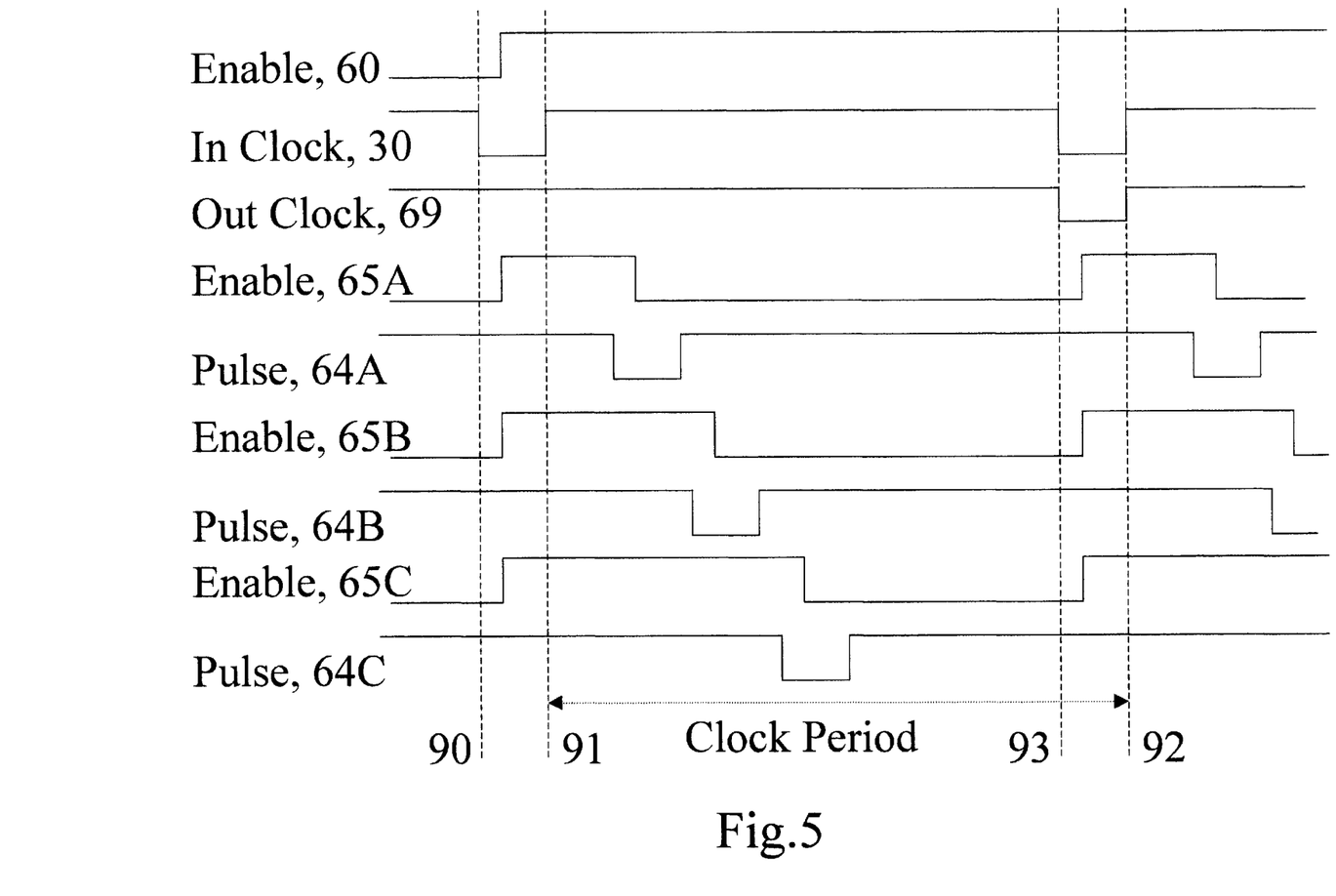
FIG. 5 is timing diagrams for the self-timed and self-enabled clock in FIG. 4.

Referring to FIGS. 4 and 5, an embodiment of the circuit of self-clock unit 21 and its timing diagram are shown. The self-clock circuit 21 is designed to generate a negative pulse, denoted "Out clock" (output node 69) in FIG. 5, at the end of the clock cycle. Self-clock circuit 21 includes input nodes 60, 30, and 50, which are for inputting, respectively, a clock enable signal, an input clock and a feedback clock. A delay chain for self-clock 21 includes a plurality of NAND gate and inverter pairs 70A–70F, an inversion gate 71 prior to output node 69. The NAND gate and inverter pairs are herein referred to as delay pairs. The plurality of delay pairs 70A–70F have corresponding output nodes 63A–63F which connect the delay pairs 70A–70F and inversion gate 71. Nodes 63A–63E are coupled to clock-pulse generated gates 72A–72E for generating of plurality of clock pulses present on outputs 64A–64E, depicted in FIG. 5, which are used for processing of plurality of operations in the clock cycle by the processing unit 12. The clock enable signal on input node 60 indicates valid data for execution by the functional unit. The input clock on input node 30 is the input clock pulse from a previous processing unit. The feedback clock on input node 50 is a pulse from the next subsequent processing unit indicating reception of valid output data from the current processing unit 12. The pulse enable signals on input nodes 65A–65E ensures a single pulse in the clock cycle for each output 64A–64E. The pulse enable signals 65A–65E are active along with the input enable signal 40. The pulse enable signals 65A–65E are deactivated by the falling edge of clock pulses 64A–64E, respectively. The pulse enable signals 65A–65E should be deactivated before the rising edge of clock pulses 64A–64E to ensure single pulses per a clock cycle.

During initialization, the enable signals on node 60 and node 65A–65E (FIG. 4) are deasserted, causing all intermediate signals on nodes 63A–63F to transition to a logic low level and causing the clock pulses on output nodes 64A–64E and 69 to transition to a logic high level. The enable signals on input nodes 60 and 65A–65E are asserted when the input clock on input node 30 is active low. The high-to-low transition of the input clock on input node 30 occurs at hashed reference line 90 of FIG. 5. The self-clock circuit 21 is not operational until the low-to-high transition of input clock 30, which occurs at hashed reference line 91 of FIG. 5. The delay is propagated through the delay pairs 70A–70F with signals 63A–63F transiting to the high level. Output signal 64A transitions to the low level causing the pulse enable signal on node 65A to switch to the low level. The feed back of output signal 64A to the input of the NAND gate in the pulse generator 72A causes the output signal 64A to return to the high level as illustrated for output signal 64A in FIG. 5. Similar clock pulses are generated for output signal 64B–64E with enable signals 65B–65E. Output signal 69 transitions to the low level, which is the beginning of a new clock cycle (line 93 of FIG. 5). Out clock 69 causes all internal signals 63A–63F to reset to the low level. Unless there is another clock pulse from In clock 30, the clock enable signal 60 will be de-asserted by the transition high-to-low of Out clock 69 causing the self-clock circuit 21 to be inactive. The clock period for a self-clock circuit 21 is the time between the low-to-high transitions of the Out clock 69 (FIG. 5).

If In clock 30 is active, then the enable signals 60 and 65A–65E are asserted at the beginning of every clock cycle. For second cycle, the self-clock circuit 21 is started when both the In clock 30 and Out clock 69 transition from low-to-high, occurring at hashed reference line 92 of FIG. 5. The current self-clock circuit 21 is synchronized with itself and with the previous processing unit self-clock circuit 21. The Out clock 69 is used by the next subsequent processing unit as the In clock. In the next cycle, the self-clock of the next subsequent processing unit generates the feedback pulse 50 similar to that of the Out clock pulse 69 of the current processing unit. If enable signal 60 remains asserted, then the self-clock circuit 21 is started when In clock 30, feedback 50, and Out clock 69 transition from low-to-high. Now, the current self-clock circuit 21 is synchronized with itself and with the self-clocks of the previous and the next subsequent processing units. Because of this synchronization, a small mismatch in the self-clocks is not a problem, but it is desirable to have matching delays through all self-clocks. The design ensures that the current, previous, and next subsequent processing units are synchronized. The first and last processing units of the pipeline processing unit can be synchronized with the external clock, thus all self-clocks are virtually synchronized to the external clock.

Another function of the feedback 50 is to wake up the stalled processing unit. The feedback 50 can enable the enable signals 60 and 65A–65E of the stalled processing unit. This type of operation would be the reverse of the above discussed forward operations. Since the processing unit which causes the primary stall condition uses its own Out clock as the feedback clock to wakeup the previous processing unit, which in turn wakes up the processing unit prior to the previous processing unit. The pulse width of the output signals 64A–64E are adjusted by increasing or decreasing the delay of the pulse generated gates 72A–72E. The overall delay must take into account the routing delay to the next subsequent processing unit and the extra logic gates (not shown) for qualifying Out clock 69. The self-clock circuit 21 can be designed to have more than one Out clock 69 having different delays for multiple blocks.

The Out clock's frequency of the self-clock design of FIG. 4 must match with the external clock's frequency or multiple of the external clock's frequency. For example, the processor can be used in many applications with various frequency from 40–80 MHz. In another application, the internal clock frequency is multiple of the external clock's frequency. The programmer must select the appropriate multiple for his application. For example, if a multiple of 3 or 2 is used for 60 MHz or 80 MHz, respectively, then the actual processor's frequency is at 180 MHz or 160 MHz. The phase-lock loop for internal clock must be able to match with multiple of the external clock. The self-clock in this invention must be able to match with the external clock or output of PLL. The self-clock is designed to have coarse and fine adjustments. The coarse adjustment can change the clock frequency an order of magnitude higher than that of fine adjustment. For example, the coarse adjustment can vary the internal clock frequency by 10 MHz increment, while the fine adjustment can vary the internal clock frequency by 1 MHz increment.

Figure 6:
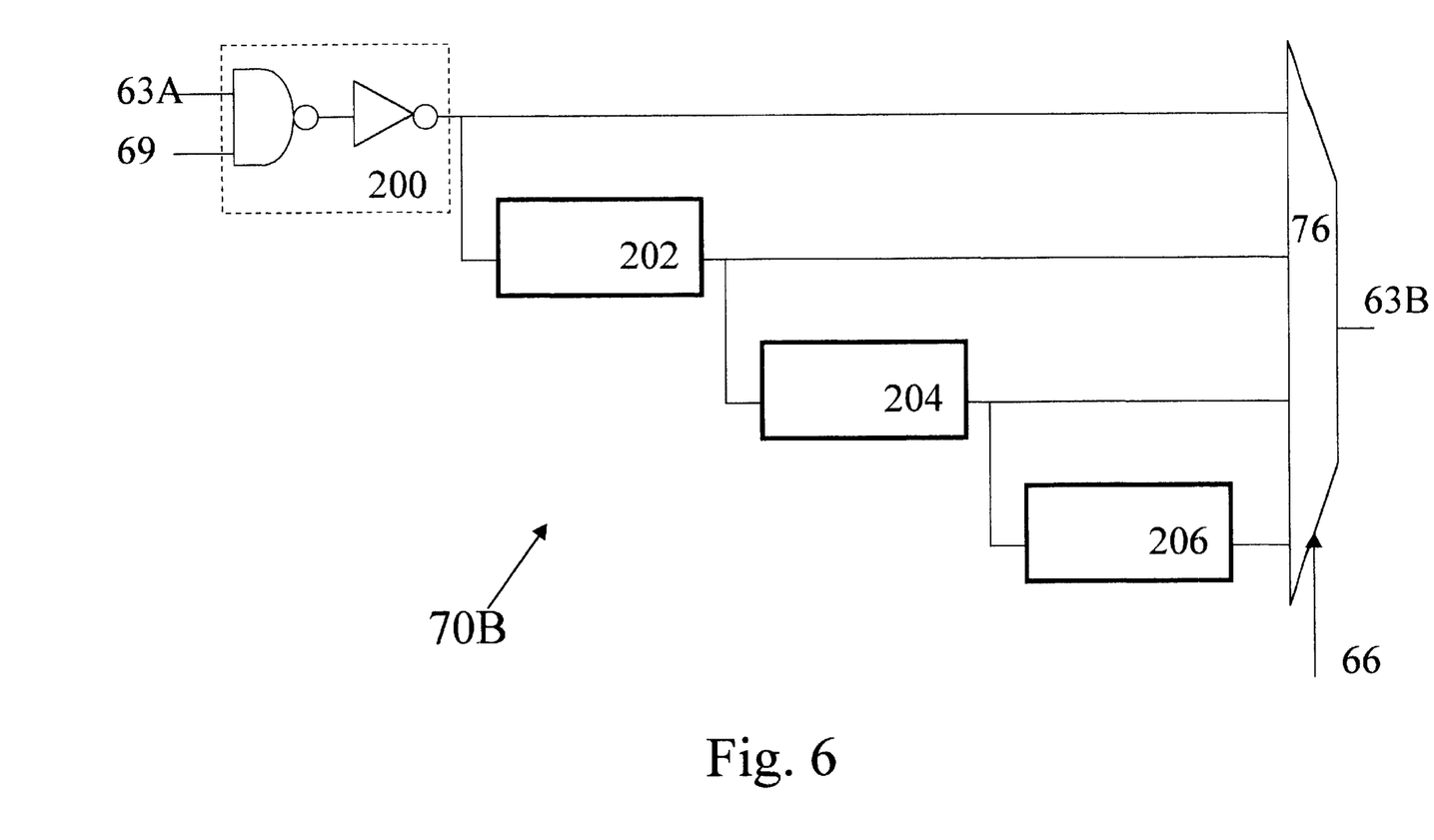
FIG. 6 is schematic for an embodiment of the delay adjustment of the self-timed and self-enabled clock in FIG. 4.

Referring to FIG. 6, a delay pair 130 is illustrated in greater detail. It should be understood that for each self-clock circuit 21, for coarse adjustment, the programmable delay can be distributed equally across all delay pairs 70B–70E, each delay pairs includes the delay unit of FIG. 6 circuitry. In another embodiment, only one of the plurality of delay pairs 70A–70E includes the delay unit circuitry of FIG. 6. Regardless of which delay pair 70A–70E includes the FIG. 6 circuitry, the circuitry would be the same. In the case of delay pairs 70A, fixed delay unit 200 of FIG. 6 would include additional inputs to account for the multiple inputs shown in FIG. 4 for delay pair 70A. For the coarse delay adjustment, the variable delays 202–206 are in addition to the fixed delay unit 200. Four selectable delays are used in this example with the output from each delay unit being input to multiplexor (MUX) 76, but the number of selectable delays can vary according to the process technology and/or implementation specifics. Selection of the appropriate delay to match the external clock is accomplished by a signal on select input 66 of MUX 76. There are several methods that the select input 66 can be generated. The frequency and frequency multiple can be programmed by the user in a register. The data in the register is used to generate the select input 66. Another technique is using external pins for directly select input 66. Select input 66 can also be programmable through JTAG or a metal mask option in fabrication. It is understood that one or combination of the above method can be used.

Figure 7:
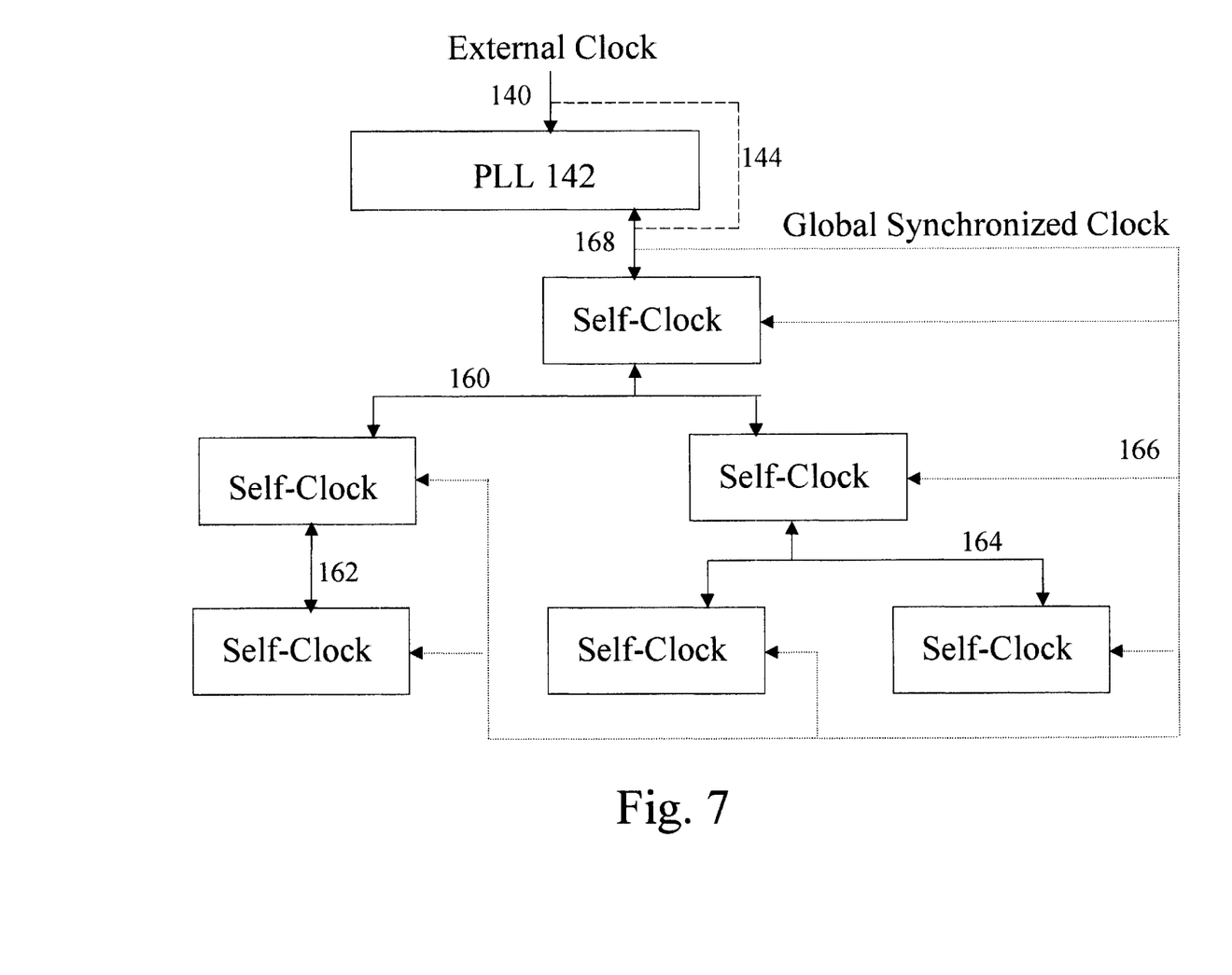
FIG. 7 is the block diagram for an embodiment of distributed self-clocks with global synchronized clock.

Turning now to FIG. 7, an embodiment of the distributed self-clocks with global synchronized clock 166. One major concern for replacing the global clock in synchronous design is how to match the clock periods of the distributed self-clocks. FIG. 7 shows six distributed self-clocks coupling with each other through clock signals, 160, 162, and 164. The phase-lock-loop (PLL) 142 couples to the first self-clock block through clock signal 168 and receives external clock 140. For system without PLL 142, the external clock 140 couples directly to the first self-clock block through wide dashed line 144. The distributed self-clocks are designed to match with the clock period of the external clock 140 or output clock 168 of the PLL 142. As a brute force technique, this invention proposes routing of the global synchronized clock 166 to all the self-clocks synchronization of the clock period during initialization. For the Out clock of each self-clock, the synchronization is performed at the point of interest which includes the routing and gating logic. The clock period of the self-clock is adjusted by changing the selector 66 (FIG. 6) until it is matched with the clock period of the global synchronized clock 166. The compare logic (not shown) for setting the clock period of the distributed self-clock should be physically placed at the location that includes routing and gating logic. During initialization of the processor, all clock periods of distributed self-clock are adjusted to match with the period of the global synchronized clock 166.

A single self-clock can couple to two self-clock blocks; clock signals 160 and 164 of FIG. 7. The routing distance and loading of the clock signals to two distinct blocks can be significantly different. In this case, two different clock signals should be generated so that they can be independently adjusted to synchronize with the global synchronized clocks. In another embodiment, two outputs with different delays can be generated from the same self-clock.

It is noted that the basic self-timed and self-enabled distributed clock in accordance with the foregoing may further employ the pipeline, programmable, usage, and synchronization mechanisms within the co-pending, commonly assigned patent application entitled "Method and Apparatus for a Self-Timed and Self-Enabled Distributed Clock", Application No. 08-969866, filed Nov. 14, 1997, by Thang Tran. The disclosure of this patent application is herein by reference in its entirety.

In accordance with the above disclosure, a simple processing unit has been shown which include a self-timed and self-enabled clock with plurality of clock pulses. The self-timed clock design includes the capability to adjust and synchronize to an external clock, which provides the deterministic output for verification and testing. The processing unit includes input queue buffer for latching incoming data in case of a stall, thus reducing the routing delay of the critical stall signal and avoiding refetching data. The processing unit further includes the output queue buffer for latching of plurality of results in a clock cycle. The invention contemplates a use with any processing unit having a synchronous clock or an asynchronous clock. It provides a method to distribute the self-enabled and self-timed clock to individual functional units in a pipeline processing unit.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A self-timed and self-enabled clock circuit for synchronizing a plurality of operations in a functional unit, comprising:
   a control circuit that detects input clock pulses and that provides an enable signal while the input clock pulses are provided;
   a clock delay device, coupled to the control circuit, that has a plurality of inputs and a plurality of outputs that provide output clock pulses when the clock delay device is enabled, the inputs including:
      a feedback clock input that is coupled to the output of the clock delay device;
      a clock input for receiving the input clock pulses; and
      an enable input that receives the enable signal to enable the clock delay device; and
   an operation control circuit, coupled to the control circuit and the clock delay device, that has an input indicating execution latency of an operation and a plurality of outputs that schedule the operation in the functional unit;
   wherein the clock delay device, when enabled by the enable signal, provides output clock pulses that are synchronized with the input clock pulses.

2. The clock circuit of claim 1 wherein the input clock pulses are provided from an output of another self-timed and self-enabled clock circuit.

3. The clock circuit of claim 1 further comprising:
   a pulse shaper circuit, coupled to the clock delay device, that provides the output clock pulses.

4. The clock circuit of claim 1 further comprising:
   the control circuit further including a stall input, the control circuit disabling the clock delay device if a stall signal is received at the stall input.

5. The clock circuit of claim 1 wherein controlling an operation in the functional unit means shifting and latching data.

6. The clock of claim 1 wherein the operation control circuit is a state machine.

7. The clock circuit of claim 1 further comprising:
   the clock delay device including a second clock input; and
   wherein the clock delay device, when enabled by the enable signal, provides output clock pulses that are synchronized with the input clock pulses and clock signals provided to the second clock input.

8. The clock circuit of claim 7 further comprising:
   the input clock pulses being provided from an output of a previous self-timed and self-enabled clock circuit; and
   the second clock input receiving clock pulses provided from a subsequent self-timed and self-enabled clock circuit.

9. The clock circuit of claim 1 wherein the clock delay device comprises a plurality of delay blocks sequentially coupled together.

10. The clock circuit of claim 9 wherein the outputs of the clock delay device are coupled to each of the plurality of delay blocks such that each output clock pulse resets each of the plurality of delay blocks.

11. The clock circuit of claim 9 wherein each of the delay blocks comprises coupled logic gates.

12. The clock circuit of claim 9 wherein at least one of the plurality of delay blocks provides an intermediate clock edge.

13. The clock circuit of claim 12 wherein the intermediate clock edge and the outputs of the operation control circuit are used to schedule an operation in the functional unit.

14. The clock circuit of claim 9 wherein one of the plurality of delay blocks comprises programmable delay logic.

15. The clock circuit of claim 14 wherein the programmable delay logic comprises:

a plurality of delay devices; and selection logic coupled to select any one of the plurality of delay devices.

16. The clock circuit of claim 15 further comprising:

each of the plurality of delay devices receiving an external clock signal and providing a corresponding clock edge; and the selection logic selecting a delay device providing a clock edge that most closely corresponds with the external clock signal.

17. The clock circuit of claim 16 wherein the selection logic selects a delay device having a clock edge that occurs closest to a controlling edge of the external clock signal.

18. A functional block, comprising:

an input queue buffer having a data input and an output, the data input being the data input of said functional block;

an output queue buffer having a result input and a data output, the data output being the data output of said functional block;

an execution unit that has an input coupled to the output of the input queue buffer and a result output coupled to the result input of the output queue buffer;

a self clock that has an output, a plurality of output clocks coupled to the input queue buffer and the output queue buffer, a first clock input, a feedback input coupled to the output of the self clock, and an enable input;

the self clock, when enabled, providing output clock pulses that are synchronized with clock pulses received at the first clock input; and a control block, coupled to the input queue buffer, the output queue buffer, the execution unit and self clock, that has an enable output coupled to the enable input of the self clock, a plurality of select outputs coupled to the input queue buffer, and a plurality of enable outputs coupled to the output queue buffer.

19. The functional block of claim 18 wherein the input queue buffer including a decode circuit to detect execution latency of an operation and an output from said decode circuit coupled to the control block.

20. The functional block of claim 18 wherein the execution unit includes a decode circuit to detect execution latency of an operation and an output from said decode circuit coupled to the control block.

21. The functional block of claim 18 further comprising:

the input queue buffer including a first storage device coupled to a second storage device and to the execution unit; and the second storage device shifts its data to the first storage device by the select outputs from the control block and the clock pulses from the self clock.

22. The functional block of claim 18 further comprising:

the output queue buffer including a first storage device coupled to a second storage device and to the execution unit; and the storage devices latch data from the execution unit by the enable outputs from the control block and the clock pulses from the self clock.

23. The functional block of claim 18 wherein the queue buffer comprises a plurality of storage devices.

24. The functional block of claim 23 wherein the plurality of storage devices comprise registers.

25. A method of operation of a functional block, comprising:

receiving input data and corresponding first input clock pulses;

activating a self clock to provide an output clock pulse for each first input clock pulse;

detecting execution latency of an operation and generating, by self clock, an output clock pulse according to the execution latency;

processing the input data, generating an output result, and using the output clock pulse to latch the output result into output queue buffer;

providing an output data from the output queue buffer; and deactivating the self clock while first input clock pulses are not received or during a stall condition.

* * * * *